(No Model.) 3 Sheets—Sheet 2.

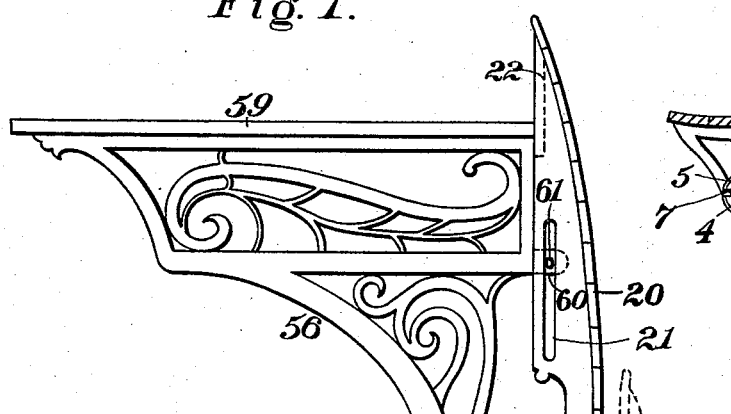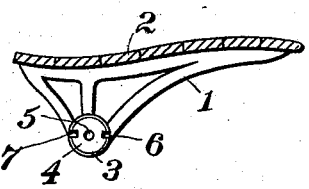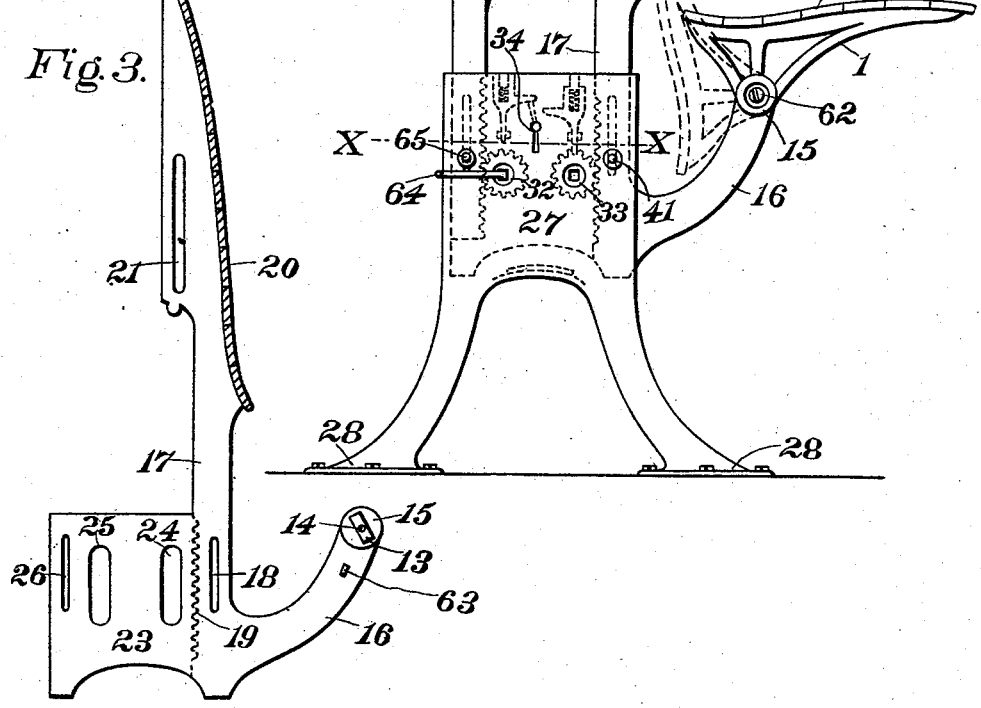

S. SPRINGSTEEN & H. HARRIS.
ADJUSTABLE SCHOOL DESK AND SEAT.

No. 572,731. Patented Dec. 8, 1896.

Witnesses
James E. Smith
William B. Thoma

Inventors
Silas Springsteen,
Hiram Harris,
By Edwin Guthrie.
Attorney

THE NORRIS PETERS CO., PHOTO-LITHO., WASHINGTON, D. C.

(No Model.) 3 Sheets—Sheet 3.
S. SPRINGSTEEN & H. HARRIS.
ADJUSTABLE SCHOOL DESK AND SEAT.
No. 572,731. Patented Dec. 8, 1896.
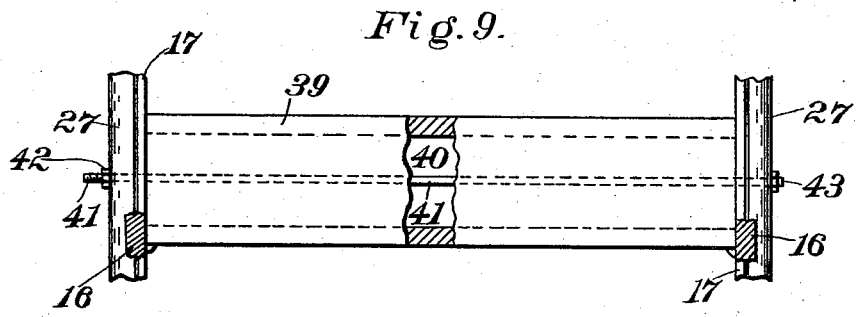
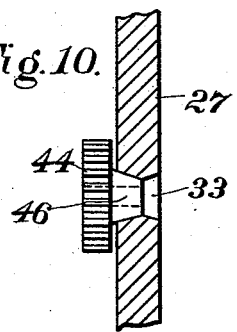
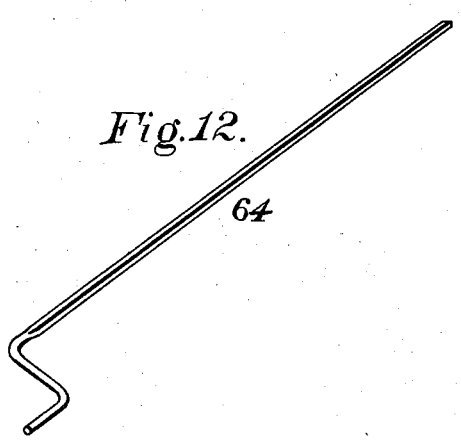
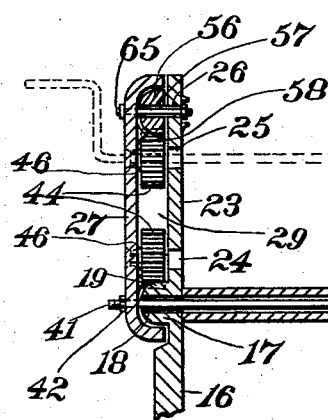
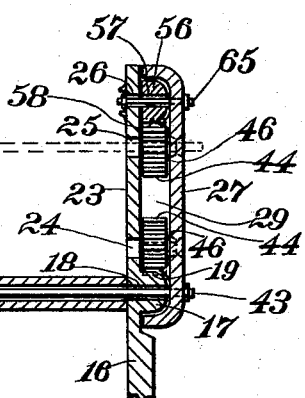
Witnesses
James S. Smith.
William B. Thomas
Inventors
Silas Springsteen,
Hiram Harris,
By Edwin Guthrie
Attorney
THE NORRIS PETERS CO., PHOTO-LITHO., WASHINGTON, D. C.

UNITED STATES PATENT OFFICE.

SILAS SPRINGSTEEN AND HIRAM HARRIS, OF HOLLAND, MICHIGAN.

ADJUSTABLE SCHOOL DESK AND SEAT.

SPECIFICATION forming part of Letters Patent No. 572,731, dated December 8, 1896.

Application filed April 1, 1896. Serial No. 585,755. (No model.)

*To all whom it may concern:*

Be it known that we, SILAS SPRINGSTEEN and HIRAM HARRIS, citizens of the United States, residing at Holland, in the county of Ottawa and State of Michigan, have invented certain new and useful Improvements in Adjustable School Desks and Seats; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to school desks and seats, more particularly to that class of school-desks which are intended for arrangement one before another in columnar order, each book shelf or desk and the seat for the next preceding desk supported by the same side frames and capable of being independently adjusted to suit physical peculiarities of different scholars.

The object of our invention is to afford better means for separately adjusting desks and seats of the character described than those now employed and to effect improvements in their general structure and arrangement.

Our invention consists of a pair of standards designed to rest upon a floor, pinions revoluble within orifices in the standards, key-operated spring-actuated bolts for locking the pinions, and independent frames bearing seat and desk, each frame provided with a rack adapted to engage the pinions. A crank-rod is constructed whereby any number of desks and seats may be successively adjusted by passing the rod through central orifices in the pinions upon opposite standards and turning them to raise or lower the pairs of frames carrying seat or desk, according as the pinions engage the racks upon one or the other pair. Each constituent element of our invention is described in detail and its office, together with the mode of operation of the whole, fully explained hereinbelow.

Figure 4:
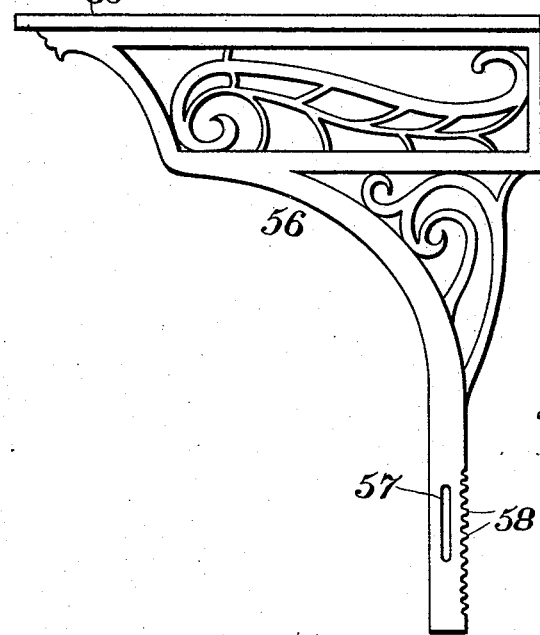
Figure 5:
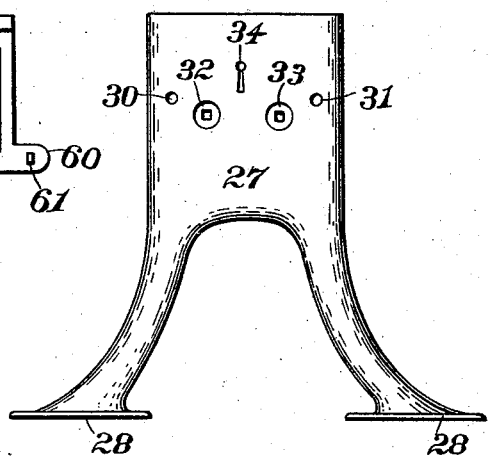
Figure 7:
Figure 8:
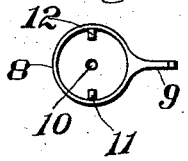
Figure 6:
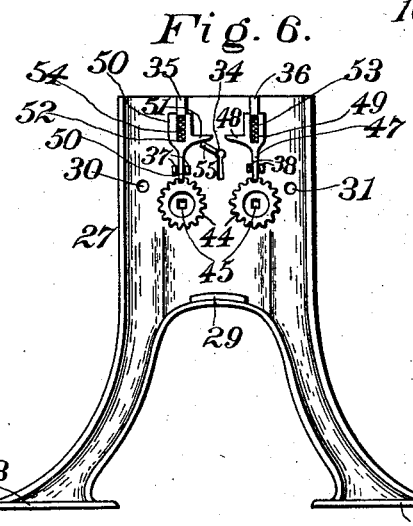

Referring to the accompanying drawings, wherein like figures designate like parts throughout the several views, Figure 1 represents a side view showing the parts assembled, the broken lines indicating the positions of internal operating elements and the upright position of seat. Fig. 2 represents an inner side view of one of the duplicate frames attached to seat-boards, the latter shown in section. Fig. 3 represents a section of the back board and an inner side view of one of the duplicate frames used to support back board and seat, also showing the flat friction-spring. Fig. 4 represents a side view of desk and one of the duplicate frames connected therewith. Fig. 5 represents an outside view of one of the duplicate standards detached and alone. Fig. 6 represents an inside view of one of the duplicate standards, showing pinions, bolts, and springs in position thereupon. Fig. 7 represents a side view of one of the duplicate caps having projecting finger. Fig. 8 represents a bottom plan view of one of the caps. Fig. 9 represents a side view of the brace and clamping-rod connecting the frames. The ninth view is taken from before the desk, the positions of brace and clamping-rod being shown with respect to the frames, the edges of which appear in the figure. Fig. 10 represents a side view of one of the pinions and a portion of the standard in section, and Fig. 11 a horizontal section on the line X X of Fig. 1 viewed from above. Fig. 12 represents the crank-rod.

It will be understood throughout this description that the frames referred to as "seat-board frame," "seat-frame," "seat-frame arm," "desk-frame," "standard," "pinions," and "pinion-locking bolts" represent one member of a pair of each, and that such members are precisely alike, excepting the structural distinction due to the fact that one is to be situated upon the right and one upon the left hand side of our invention.

Considering Figs. 1 and 2, numeral 1 designates the seat-board frame, fastened across and near the ends of seat-boards 2 of common construction and arrangement. Frame 1 is usually triangular in shape and possesses at the apex of the angle opposite the seat-board side a circular flat portion 3, having concentrically placed a circular raised portion 4, resulting in an annular shoulder near the circumference of the portion 3. A central orifice 5 extends through both portions 3 and 4, and recesses 6 and 7 are provided in the edges of those portions for a purpose to be hereinafter explained.

8 designates a dished or concavo-convex cap (see Fig. 7) having a bent finger 9, a central orifice 10, (see Fig. 8,) and lugs 11 and 12, constructed to fit the recesses 6 and 7 already mentioned.

In Fig. 3, number 13 designates the flat friction-spring, which is usually curved and pierced by a middle orifice 14. The spring is designed to be placed upon the inner surface of a flat disk portion terminating the arms 16, forming part of the frames 17 and constructed to support the seat-board frames.

18 designates the lower slot in frame 17, to the right of rack 19, which is formed integral with or attached to the inner edge of the lower portion of that frame.

20 20 designate the ends of boards constituting the back of seat 2.

21 marks the upper slot in frame 17, and 22 represents the end of a board joining the frames 17 near the top and behind the back boards of seat. The board 22 acts partly as a brace for the topmost portions of the seat-frames 17 and affords a more finished appearance to the desk when viewed from the rear.

23 marks the lower lateral extension of frame 17, having intermediate slots 24 and 25, somewhat greater in width and length than slot 18, previously mentioned, and which is similar to slot 26 upon the left of the extension. (See Fig. 3.)

27 marks the standard, having feet 28 bored and countersunk in order that they may be screwed to a floor in the common manner. The standard has also, as ordinarily constructed, a curved projection or lug 29, upon which extension 23 may rest when at its lowest point. This lug is not, however, essential.

In Fig. 5 will be seen the orifices 30 and 31 through the standard, being for a clamping-bolt and clamping-rod hereinafter noticed; also orifices 32 and 33, formed to fit the hubs of the pinions, and a keyhole 34 for the introduction of the bolt-operating key.

In Fig. 6 appear the end guide-lugs 35 and 36 and the point guide-lugs 37 and 38 for the pinion-locking bolts.

39 designates the seat-shield, specifically a hollow rectangular open-ended box, constructed to extend from seat-frame to seat-frame and act as a brace to fix their positions. Suitable lugs may be fashioned upon the frames 17 to support the shield when clamping bolts and rods are loosened, but such lugs are not absolutely necessary. The hollow interior 40 of the shield is an essential feature in order that sufficient space may be available to permit clamping-rod 41 to be fixed at opposite points, as explained hereinafter. The clamping-rod is of well-known form, having a threaded end adapted to engage a nut 42 and possessing a head 43 at its other extremity.

Number 44 marks the pinions, of which we employ four, all alike, each having a square or angular central orifice 45 and an extended hollow hub or bushing 46, designed to fit and rotate within the orifices 32 and 33 in the standard. Fig. 10 represents a side view of one of the pinions.

Returning to Fig. 6, 47 marks the right-hand pinion-locking bolt, having the projecting portion 48, provided with a curved lower edge, and a recess 49 in the upper end of the body portion.

50, 51, and 52 refer to bolt, projection, and recess, (shown upon the left-hand side in Fig. 6,) and the two bolts 47 and 50 are substantially alike.

53 and 54 designate, respectively, the spiral springs which operate the right and left hand bolts, and 55 marks a key of any chosen form employed to actuate either bolt at will of the operator.

56 marks the book shelf or desk frame, (see Fig. 4,) and 57 designates a slot and 58 a rack formed through and upon the edge of the lower part of the frame.

59 designates a book shelf or desk of any convenient shape and needing no special description. Upon the desk-frame at or near the top is placed an ear 60, having a lug 61, constructed to enter and travel the slot 21 in frame 17.

62 marks a clamping-bolt of the same general construction as rod 41, and like it provided with a head at one end and screw-thread and nut at the other. Its office is to clamp caps 8, seat-board frames, flat friction-spring, and seat-frame arms together. When those parts are clamped by the bolt, the friction-spring is compressed and acts to retard the motion of the seat, which when raised into its vertical position, Fig. 1, cannot fall by its own weight.

63 marks a projecting lug upon the seat-frame arm 16, intended to come into contact with the bent finger 9 of cap 8, thereby limiting the movement and fixing the horizontal position of the seat.

64 designates a rod formed to correspond with the orifices 45 through the pinions and possessing at one end a crank, either separable or formed of a continuation of the rod itself. It is by means of this crank-rod that the desk and seat frames are raised and lowered, and it is obvious that one rod will answer for any number of desks in a school-room.

65 denotes a bolt of any selected shape and of ordinary character provided with a head, a threaded end, and nut.

The operation of our invention will be now easily followed. From an inspection of Fig. 11 may be learned the order in which the frames are placed. Upon the inside is found the extension of the seat-frame, then at the left-hand side the desk-frame, and, finally, the standard. It will be observed that the extension 23 of the seat-frame is somewhat thinner than the upright portion 17 and that the offset or shoulder formed by the meeting of the two portions approximates the thickness of the desk-frame at its lower section. It is upon the inner edge of the shoulder in the seat-frame just mentioned that the rack 19 is cut. The construction and arrangement described leave an interior chamber between the seat-frame extension and standard, within which the pinions and pinion-locking bolts operate. It is most convenient to cast the upright portions of frames 17 and 56 half-round in form and to turn the edges of the standard inwardly, as shown in Fig. 11. Projections from the inner surface of standard suitably placed, together with the turned edges, afford half-round channels for the reception and guidance of the upright portions of seat and desk frames. We do not, however, limit ourselves to this special shape.

Assuming all the parts to be assembled as represented in Fig. 1 and that bolts and clamping-rods have been set up tightly, let it be desired to raise or lower either seat-frame or desk-frame without disturbing the other. The springs 53 and 54 have forced the points of the bolts 47 and 50 between the teeth of the pinions, thus preventing rotation. It is necessary therefore to introduce key 55 in keyhole 34 in order that either bolt may be raised and its relating pinion freed. In raising the seat-frame nut 42 upon rod 41 is loosened, bolt 47 is raised, crank-rod 64 inserted through orifices 45 in pinions upon opposite standards and turned until the required adjustment is reached, when the bolt is permitted to reëngage the pinion, thus holding the parts in adjustment until seat-shield 39 can be properly arranged and the nut 42 again set up. The operation being the same with relation to the desk-frame, further explanation is omitted. It will now be understood that the intermediate slots in the seat-frame extension 23 are to be of such width and of such length as to allow the frame full upward and downward movement without obstruction from the crank-rod.

We are aware that rack-and-pinion mechanisms have been employed for the purposes of adjusting movable parts of pieces of furniture, and we do not claim that feature broadly. We do, however, reserve the right to vary the exact form and arrangement of parts shown and described within the limits of our invention as set forth and to use efficient nut or bolt locking devices, if desired.

What we claim, and desire to secure by Letters Patent, is—

1. In an adjustable school desk and seat, the combination of standards having suitable orifices, pinions provided with extended hubs constructed to movably fit orifices in the standards, corresponding seat-frames each consisting of a projecting arm, a main upright slotted portion and a lateral extension having a plurality of slots, a clamping-rod and bolts adapted to pass through slots in said seat-frames and orifices in said standards, racks formed integral with or fixed upon said seat-frames and arranged to engage said pinions, and means for operating said pinions, substantially as described.

2. In an adjustable school desk and seat, the combination of standards having suitable orifices, pinions provided with extended hubs constructed to movably fit orifices in the standards, corresponding seat-frames each consisting of a projecting arm, a main upright portion and a lateral extension having a plurality of slots, said upright portion possessing upper and lower longitudinal slots, a clamping-rod and bolts adapted to pass through slots in said seat-frames and orifices in said standards, racks formed integral with or fixed upon said seat-frames, desk-frames having lugs arranged to engage the upper slots in the upright portions of said seat-frames, said desk-frames having longitudinal slots, racks formed integral with or fixed upon said desk-frames, and means for operating said pinions, substantially as described.

3. In an adjustable school desk and seat, the combination of standards having suitable orifices and keyholes, pinions provided with extended hubs constructed to movably fit orifices in the standards, bolts 47 and 50, said standards having projecting lugs adapted to guide the bodies and lower ends of said bolts, springs formed to be arranged between said bolts and body-guiding lugs, and a key adapted to operate said bolts, substantially as described.

4. In an adjustable school desk and seat, the combination of standards having suitable orifices, pinions provided with extended hubs constructed to movably fit orifices in the standards, means for operating said pinions, bolts borne by said standards and adapted to engage and lock said pinions, means for operating said bolts, seat-frames each consisting of a projecting arm, a main upright portion and a lateral extension having a plurality of slots, said upright portions possessing upper and lower longitudinal slots, a clamping-rod and bolts adapted to pass through slots in said seat-frames and orifices in said standards, racks formed integral with or fixed upon said seat-frames, desk-frames having lugs arranged to engage the upper slots in the upright portions of said seat-frames, said desk-frames having longitudinal slots, racks formed integral with or fixed upon said desk-frames, and a hollow brace constructed to connect opposite frames, substantially as described.

In testimony whereof we affix our signatures in presence of two witnesses.

SILAS SPRINGSTEEN.
HIRAM HARRIS.

Witnesses:
ADRIAN VAN PUTTER,
GEO. E. KOLLEN.